Patented July 18, 1944

2,354,011

UNITED STATES PATENT OFFICE 2,354,011

METHOD OF ADHERING RUBBER TO METAL AND PRODUCT THEREOF

Malcolm E. Gross, Akron, Ohio, assignor to The B. F. Goodrich Company, New York, N. Y., a corporation of New York No Drawing. Application January 6, 1942, Serial No. 425,764

9 Claims. (Cl. 154—2)

This invention relates to a method of promoting the adhesion of rubber to metal by means of salts, particularly soaps of aliphatic fatty acids, that have been prepared in a particular manner and to the composite rubber-metal product so obtained.

It has been known for some time that the heavy metal salts of organic acids, and particularly the soaps of heavy metals and aliphatic fatty acids, may be used to promote the adhesion of rubber to metal when the salts are interposed between the normally contacting surfaces of the rubber and the metal. Actual practice has proven, however, that various difficulties arise in the use of these organic salts of heavy metals for promoting adhesion between rubber and metal in that uniformly satisfactory results are not always obtained and, prior to this invention, some of the salts could not be made to work at all in actual production. It is an object of this invention to provide a method of adhering rubber to metal through the use of heavy metal salts of organic acids, particularly the soaps of heavy metals and aliphatic fatty acids, when such salts are prepared in a particular manner hereinafter described. The improved adhesion resulting from this invention produces a more tenacious rubber to metal bond and more uniform products in the rubber-metal composite structure incorporating the salts that are prepared by the method specified.

By the method of this invention I make a superior rubber-metal composite structure by interposing certain heavy metal salts of organic acids between a metal surface and a vulcanizable rubber composition and vulcanizing the rubber under pressure. The salts that are used in this invention are made by reacting an organic acid material whose dissociation constant is not greater than $9.5 \times 10^{-4}$ with an organo-metallic salt of a heavy metal and an organic acid. This reaction is carried out in a solvent medium in which the reacting organic acid and the reacting organo-metallic salt are soluble but in which the salt that is produced is insoluble. Typical acids that may be used include all the aliphatic fatty acids, aromatic acids such as benzoic acid, abietic acid, the naphthenic acids, phthalic acid, and many others, as well as acid salts and acid anhydrides that produce weak acid reactions as indicated by dissociation constants within the scope hereinabove indicated. It is preferred that the reacting organo-metallic salt be the salt of a weak organic acid so that the by-product that is formed will be a weak organic acid. The acid that is used to react with the organo-metallic salt should have a dissociation constant of not more than $9.5 \times 10^{-4}$ and preferably should be an aliphatic fatty acid as the heavy metal soaps are preferred for use as adhesion promoters in this invention. The reacting organo-metallic salt is preferably the salt of a heavy metal and an organic acid whose dissociation constant is not more than $2.0 \times 10^{-5}$, or, in other words, an acid not stronger than acetic acid. The metals of these organo-metallic salts may be any heavy metal, which excludes sodium and potassium, but those metals with more than one valency, that is, metals capable of combining with elements or radicals in two or more different ratios, are preferred, particularly copper, cobalt, iron, lead, and the like. Metals which exhibit one valency may also be used however. Further, it is possible to employ either univalent or polyvalent heavy metals.

A typical reaction is one in which stearic acid is reacted with cobalt acetate to form cobalt stearate and acetic acid. In practicing this embodiment of the invention, 4.0 parts by weight of cobalt acetate are dissolved in the smallest amount of water possible, around 5 parts, and the solution is diluted with 125 parts of boiling methanol. Slightly less than the amount of stearic acid theoretically required to react quantitatively with the cobalt acetate (8.5 parts) is added to the cobalt acetate solution and the cobalt stearate begins immediately to precipitate out. The precipitate of the soap is stirred vigorously while cooling to room temperature and immediately upon cooling the soap is filtered by suction and washed on the filter by small additional amounts of methanol. After the washing the soap is dried and is then ready to use either in a layer of the soap between a metal surface and a vulcanizable rubber composition, or mixed with a rubber cement and applied in this cement form between a metal surface and a vulcanizable rubber composition, or mixed in a vulcanizable rubber composition which is used as a "tie stock" between the main body of rubber and the metal surface. When the rubber is vulcanized under pressure it will be found to be tightly adhered to the metal surface.

In the preferred method of reacting an aliphatic fatty acid with an organo-metallic salt any of the fatty acids may be used but those of higher molecular weight with at least six carbon atoms in the aliphatic chain are preferred. These include n-heptoic acid, caprylic acid, lauric acid, oleic acid, linoleic acid, linolenic acid, palmitic acid, stearic acid, and many others.

As stated hereinabove, the organo-metallic salts and the reacting organic acids of a dissociation constant not greater than $9.5 \times 10^{-4}$ are dissolved in solvents in which the particular heavy metal salt that is produced is insoluble. As is apparent the choice of the solvent will be governed by the particular reaction and the particular reacting substances used to produce any salt. This is all within the knowledge and experience of those skilled in the art. In the specific example given hereinabove methanol is an ideal solvent. In making copper stearate from copper acetate the solvent could well be hot water. In making lead palmitate from lead acetate the solvent could be ethyl alcohol. In general the solvent used may be water or any of the common organic solvents with the choice depending upon the particular salt desired to be produced and the particular reacting substances, the acid and the organo-metallic salt, that are used. The solvent may be a single solvent or a mixture of more than one. These solvents include water, the alcohols, the ethers, ketones, and the like.

By the method of this invention a salt, such as a soap, is produced that has vastly superior properties in adhering rubber to metal when employed in the well-known methods by which such adhesion is obtained. These methods include principally mixing the salt in a rubber cement and applying the cement either to the metal surface or to the contacting rubber surface or both, applying the salt direct, or mixing the salt in a vulcanizable rubber composition and interposing this rubber composition between the metal and the rubber to be adhered. A vulcanizable rubber composition is used for adhering to the metal and upon vulcanizing the rubber under pressure the rubber will be found to be tightly adhered to the metal. By the use of these salts in adhering rubber to metal "spottiness" in the adhesion is prevented, uniform results are obtained in mass production, and greatly improved results are obtained in every case.

Having disclosed my invention together with specific examples of methods for practicing the invention and typical materials to be used, it is my desire to protect the invention broadly within the spirit and scope of the appended claims.

I claim:

1. The method of making a composite rubber-metal structure comprising rubber and metal in adhering relation which comprises interposing a salt between a vulcanizable rubber composition and the metal and vulcanizing the assembly under pressure, said salt being made by reacting an acid having a dissociation constant not greater than about $9.5 \times 10^{-4}$ with an organo-metallic salt of a heavy metal and an organic acid having a dissociation constant not greater than about $2.0 \times 10^{-5}$, said reaction being produced in a solvent medium in which the acid and the reacting salt are soluble but in which the salt that is produced is insoluble.

2. The method of making a composite rubber-metal structure comprising rubber and metal in adhering relation which comprises interposing a soap between a vulcanizable rubber composition and the metal and vulcanizing the assembly under pressure, said soap being made by reacting an aliphatic fatty acid with an organo-metallic salt of a heavy metal and an organic acid having a dissociation constant not greater than about $2.0 \times 10^{-5}$, said reaction being produced in a solvent medium in which the aliphatic fatty acid and the salt are soluble but in which the soap is insoluble.

3. The method of making a composite rubber-metal structure comprising rubber and metal in adhering relation which comprises interposing a soap between a vulcanizable rubber composition and the metal and vulcanizing the assembly under pressure, said soap being made by reacting an aliphatic fatty acid having at least six carbon atoms in the aliphatic chain with an organo-metallic salt of a heavy metal and an organic acid having a dissociation constant not greater than substantially $2.0 \times 10^{-5}$, said reaction being produced in a solvent medium in which the fatty acid and the salt are soluble but in which the soap is insoluble.

4. The method of making a composite rubber-metal structure comprising rubber and metal in adhering relation which comprises interposing a soap between a vulcanizable rubber composition and the metal and vulcanizing the assembly under pressure, said soap being made by reacting an aliphatic acid having at least six carbon atoms in the aliphatic chain with an organo-metallic salt of a metal having more than one valency and an organic acid having a dissociation constant not greater than substantially $2.0 \times 10^{-5}$, said reaction being produced in a solvent medium in which the aliphatic acid and the salt are soluble but in which the soap is insoluble.

5. The method of making a composite rubber-metal structure comprising rubber and metal in adhering relation which comprises interposing cobalt stearate between a vulcanizable rubber composition and the metal and vulcanizing the assembly under pressure, said cobalt stearate being made by reacting stearic acid and cobalt acetate in methanol and filtering out the cobalt stearate.

6. A composite product comprising rubber and metal bonded together by a tenacious, lasting bond of substantial uniformity produced in accordance with the method of claim 1.

7. A composite product comprising rubber and metal bonded together by a tenacious, lasting bond of substantial uniformity produced in accordance with the method of claim 3.

8. A composite product comprising rubber and metal bonded together by a tenacious, lasting bond of substantial uniformity produced in accordance with the method of claim 4.

9. A composite product comprising rubber and metal bonded together by a tenacious, lasting bond of substantial uniformity produced in accordance with the method of claim 5.

MALCOLM E. GROSS.

CERTIFICATE OF CORRECTION.

Patent No. 2,354,011.                                                July 18, 1944.

MALCOLM E. GROSS.

It is hereby certified that error appears in the printed specification of the above numbered patent requiring correction as follows: Page 2, second column, line 57, claim 7, for the claim reference numeral "3" read --2--; and that the said Letters Patent should be read with this correction therein that the same may conform to the record of the case in the Patent Office.

Signed and sealed this 19th day of December, A. D. 1944.

Leslie Frazer

(Seal)                                Acting Commissioner of Patents.